US010551835B2

(12) United States Patent
Mason et al.

(10) Patent No.: US 10,551,835 B2
(45) Date of Patent: Feb. 4, 2020

(54) SYSTEMS AND METHODS FOR OPERATOR SKILL MITIGATION

(71) Applicant: Toyota Research Institute, Inc., Los Altos, CA (US)

(72) Inventors: Julian M. Mason, Redwood City, CA (US); Nikolaos Michalakis, Saratoga, CA (US)

(73) Assignee: Toyota Research Institute, Los Altos, CA (US)

( * ) Notice: Subject to any disclaimer, the term of this patent is extended or adjusted under 35 U.S.C. 154(b) by 0 days.

(21) Appl. No.: 15/918,669

(22) Filed: Mar. 12, 2018

(65) Prior Publication Data
US 2019/0278263 A1 Sep. 12, 2019

(51) Int. Cl.
*G05D 1/00* (2006.01)
*B60W 50/14* (2012.01)
(Continued)

(52) U.S. Cl.
CPC ........... *G05D 1/0061* (2013.01); *B60W 10/04* (2013.01); *B60W 10/18* (2013.01); *B60W 10/20* (2013.01); *B60W 40/09* (2013.01); *B60W 50/14* (2013.01); *B60W 2540/12* (2013.01); *B60W 2540/18* (2013.01); *B60W 2540/30* (2013.01); *B60W 2550/12* (2013.01); *B60W 2710/09* (2013.01); *B60W 2710/18* (2013.01); *B60W 2710/20* (2013.01); *B60Y 2302/07* (2013.01); *G05D 2201/0213* (2013.01)

(58) Field of Classification Search
None
See application file for complete search history.

(56) References Cited

U.S. PATENT DOCUMENTS 8,217,777 B2 7/2012 Sekiyama et al.
9,586,559 B2 * 3/2017 Keating ................ H04W 4/046
(Continued)

FOREIGN PATENT DOCUMENTS

DE 102006000326 A1 1/2007
DE 102013016488 A1 4/2015

OTHER PUBLICATIONS

Uluer et al., "Driver's authority monitoring system for intelligent vehicles: A feasibility study", Abstract, Intelligent Vehicles Symposium (IV), 2012 IEEE, Jun. 3-7, 2012, 2 pages.
(Continued)

*Primary Examiner* — K. Wong
(74) *Attorney, Agent, or Firm* — Christopher G. Darrow; Darrow Musafa PC

(57) ABSTRACT

The systems and methods described herein disclose regulation of vehicle access based on operator proficiency. The systems and methods for regulating vehicle access by an operator include determining, using driving capacity information, a driving capacity metric for an operator in a vehicle. A vehicle system of the vehicle can then be evaluated for a vehicle system proficiency. The driving capacity metric and the vehicle system proficiency can then be compared. Then, using the comparison, a proficiency level of the operator can be determined for the at least one vehicle system. Finally, access to the at least one vehicle system can be provided to the operator based on the proficiency level.

17 Claims, 5 Drawing Sheets

(51) Int. Cl.
  *B60W 10/04* (2006.01)
  *B60W 10/18* (2012.01)
  *B60W 10/20* (2006.01)
  *B60W 40/09* (2012.01)

(56) References Cited

U.S. PATENT DOCUMENTS

| | | | |
|---|---|---|---|
| 9,703,289 B2 | 7/2017 | Sato et al. | |
| 10,054,944 B2* | 8/2018 | Jones | B60W 30/08 |
| 10,266,180 B1* | 4/2019 | Fields | B60W 40/08 |
| 2010/0063697 A1* | 3/2010 | Lindgren | B60W 10/06 |
| | | | 701/59 |
| 2012/0239242 A1 | 9/2012 | Uehara | |
| 2013/0325521 A1* | 12/2013 | Jameel | G06Q 10/02 |
| | | | 705/5 |
| 2015/0254955 A1* | 9/2015 | Fields | G08B 21/02 |
| | | | 705/4 |
| 2016/0009294 A1 | 1/2016 | Gunaratne | |
| 2016/0176412 A1 | 6/2016 | Gunaratne | |
| 2017/0057542 A1 | 3/2017 | Kim et al. | |
| 2017/0088128 A1* | 3/2017 | Nakada | B60W 30/02 |
| 2018/0059663 A1 | 3/2018 | Yako et al. | |

OTHER PUBLICATIONS

Jeon, "UX Challenges and Opportunities of Autonomous Vehicles regarding Driving Styles and Automation Levels", Automotive UI 215, Sep. 1-3, 2015, 5 pages.

International Search Report and Written Opinion for International Application No. PCT/US2019/021601, dated Jul. 16, 2019 (13 pages).

* cited by examiner

SYSTEMS AND METHODS FOR OPERATOR SKILL MITIGATION

TECHNICAL FIELD

Embodiments described herein generally relate to autonomous vehicles. More specifically, the embodiments generally relate to systems and methods of controlling a vehicle in light of operator behavior and skill.

BACKGROUND

Operation of a motor vehicle has been common place for over a century. Vehicles have long been operated by a competent operator using controls within the vehicle, such as a steering wheel and pedals. However, operator proficiency for driving a vehicle varies widely as different operators have different skill levels. As expected, a person who has years of experience driving will be more proficient in navigating roads than a person who is new to driving. Also, different driving situations require different levels of skill to drive safely. For example, an operator may be able to easily navigate certain residential areas, but may not have mastered the skillset to navigate on highways. Operator proficiency can vary by age, training, innate capability or other factors. As vehicles are inherently dangerous devices, operator competency and proficiency are valuable.

SUMMARY

The systems and methods described herein include determination of operator proficiency and control of one or more vehicle systems in light of said proficiency. In one embodiment, a vehicle regulation system for regulating vehicle access by an operator is disclosed. The vehicle regulation system can include one or more processors; and a memory communicably coupled to the one or more processors. The memory can store a measurement module including instructions that when executed by the one or more processors cause the one or more processors to determine, using driving capacity information, a driving capacity metric for an operator in a vehicle. The memory can further store a comparison module including instructions that when executed by the one or more processors cause the one or more processors to evaluate at least one vehicle system in the vehicle for a vehicle system proficiency, and to compare the driving capacity metric and the vehicle system proficiency. The memory can further store an evaluation module including instructions that when executed by the one or more processors cause the one or more processors to determine, using the comparison, a proficiency level of the operator for the at least one vehicle system, and to provide, to the operator, access to the at least one vehicle system based on the proficiency level.

In another embodiment, a non-transitory computer-readable medium for regulating vehicle access by an operator is disclosed. The memory can storing instructions that when executed by one or more processors cause the one or more processors to determine, using driving capacity information, a driving capacity metric for an operator in a vehicle. The memory can further store instructions to evaluate at least one vehicle system in the vehicle for a vehicle system proficiency. The memory can further store instructions to compare the driving capacity metric and the vehicle system proficiency. The memory can further store instructions to determine, using the comparison, a proficiency level of the operator for the at least one vehicle system. The memory can further store instructions to provide, to the operator, access to the at least one vehicle system based on the proficiency level.

In another embodiment, a method for regulating vehicle access by an operator is disclosed. The method can include determining, using driving capacity information, a driving capacity metric for an operator in a vehicle. The method can further include evaluating at least one vehicle system in the vehicle for a vehicle system proficiency. The method can further include comparing the driving capacity metric and the vehicle system proficiency. The method can further include determine, using the comparison, a proficiency level of the operator for the at least one vehicle system. The method can further include providing, to the operator, access to the at least one vehicle system based on the proficiency level. Embodiments of the present application can be more clearly understood with relation to the figures and the description below.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Systems and methods described herein determine operator proficiency with one or more vehicle systems. This proficiency can then be used to restrict or allow access for the operator to said vehicle systems. Embodiments described herein leverage data from the Controller Access Network (CAN) bus, external environment sensors, and other components of the vehicle. The systems and methods monitor the operator's behavior and determine how "trustworthy" or how "skilled" they are, in the operation of the vehicle generally and in the operation of one or more components of the vehicle. In some examples, the vehicle can compare the operator's decision to what the vehicle would do in the same scenario to determine if the operator's skill level.

Once the system and methods have determined the operator's skill level (e.g., operator proficiency), the system and methods can then allow for an appropriate level of vehicle interaction and control. In one example, when maximum skill level is determined, the vehicle can permit the maximum spectrum of behavior. In this regard, the operator can then operate the vehicle in any environment and in any area. However, if the operator is not highly skilled or their normal skill level is otherwise affected (i.e., a new operator or a temporarily diminished operator), the systems and methods described herein can set a "hard ceiling" on the vehicle's capabilities in order to guarantee that the semi-autonomous and autonomous systems can keep the vehicle safe. Operational control can take the form of limiting when the operator operates the vehicle (e.g., certain times of day), where the operator operates the vehicle (e.g., city driving, residential driving, highway driving, etc.), conditions when the operator operates the vehicle (e.g., high traffic, inclement weather, etc.), other forms of operator restriction, or combinations thereof.

Further, the systems and methods described herein are adaptive to a given operator. In one example, if an operator consistently runs stop signs, the systems and methods learn that said operator is less capable, and decreases the vehicle's capabilities. If the operator then learns to stop correctly, the systems and methods can then learn this new behavior and relax the above restrictions. When applied to new operators, the systems and methods can act as a teaching tool. As the operator demonstrates competence in new scenarios, the system unlocks new vehicle capabilities (e.g., speed, freeway access, etc.). In this sense, the systems and methods described herein are a "gamification of driving performance", without actually turning driving itself into a game. The operator is given access to different functionalities as the operator's skills progress. Embodiments of the present application can be more clearly understood with relation to the figures and the description below.

Figure 1:
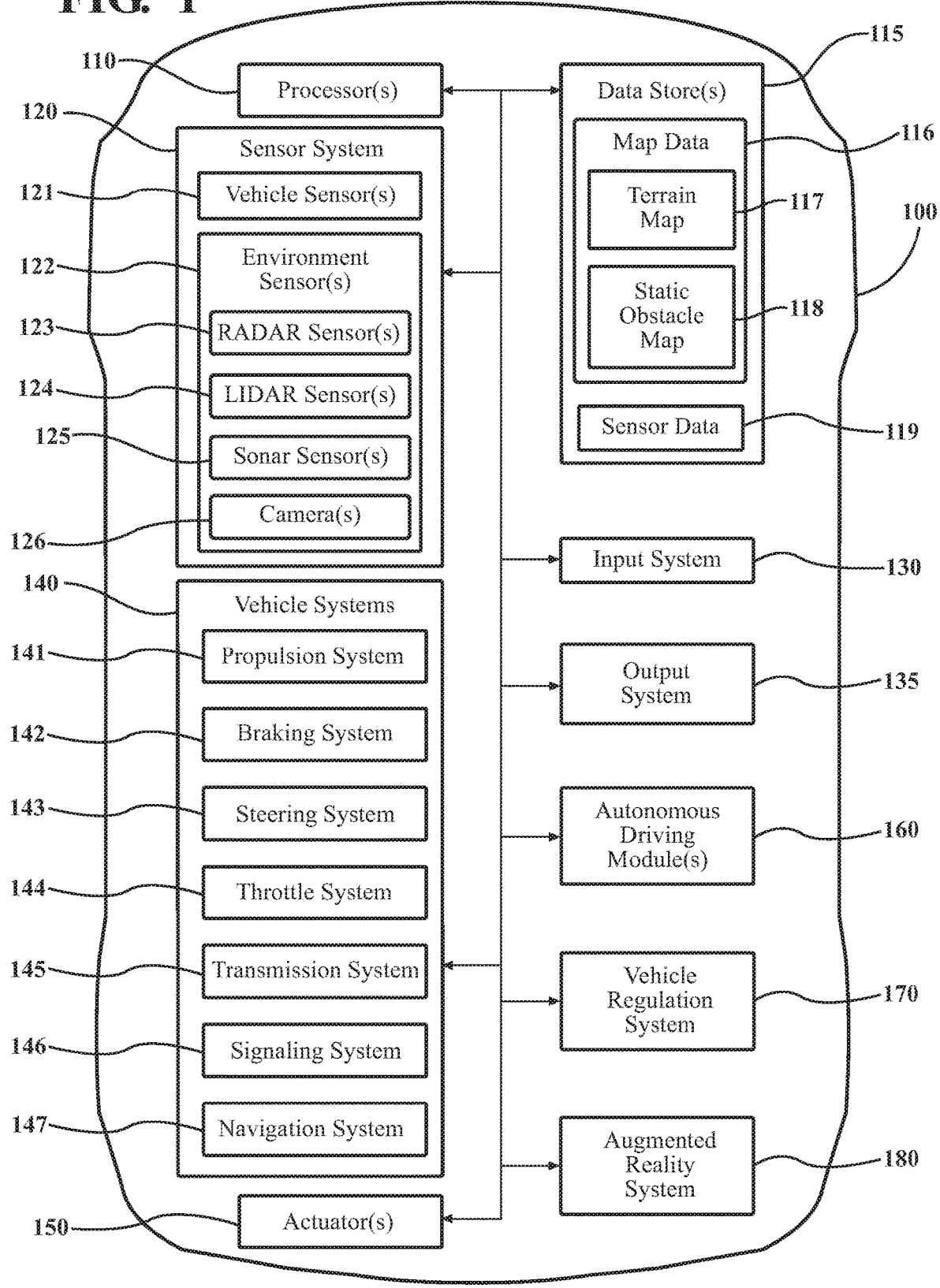
FIG. 1 is a block diagram of a vehicle useable as part of a vehicle regulation system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate autonomously, semi-autonomously, or manually by an in-vehicle operator. The vehicle 100 can include a vehicle regulation system 170 or capabilities to support a vehicle regulation system 170, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a more thorough understanding of the embodiments described herein. Those of skill in the art, however, will understand that the embodiments described herein may be practiced using various combinations of these elements.

Figure 2A:
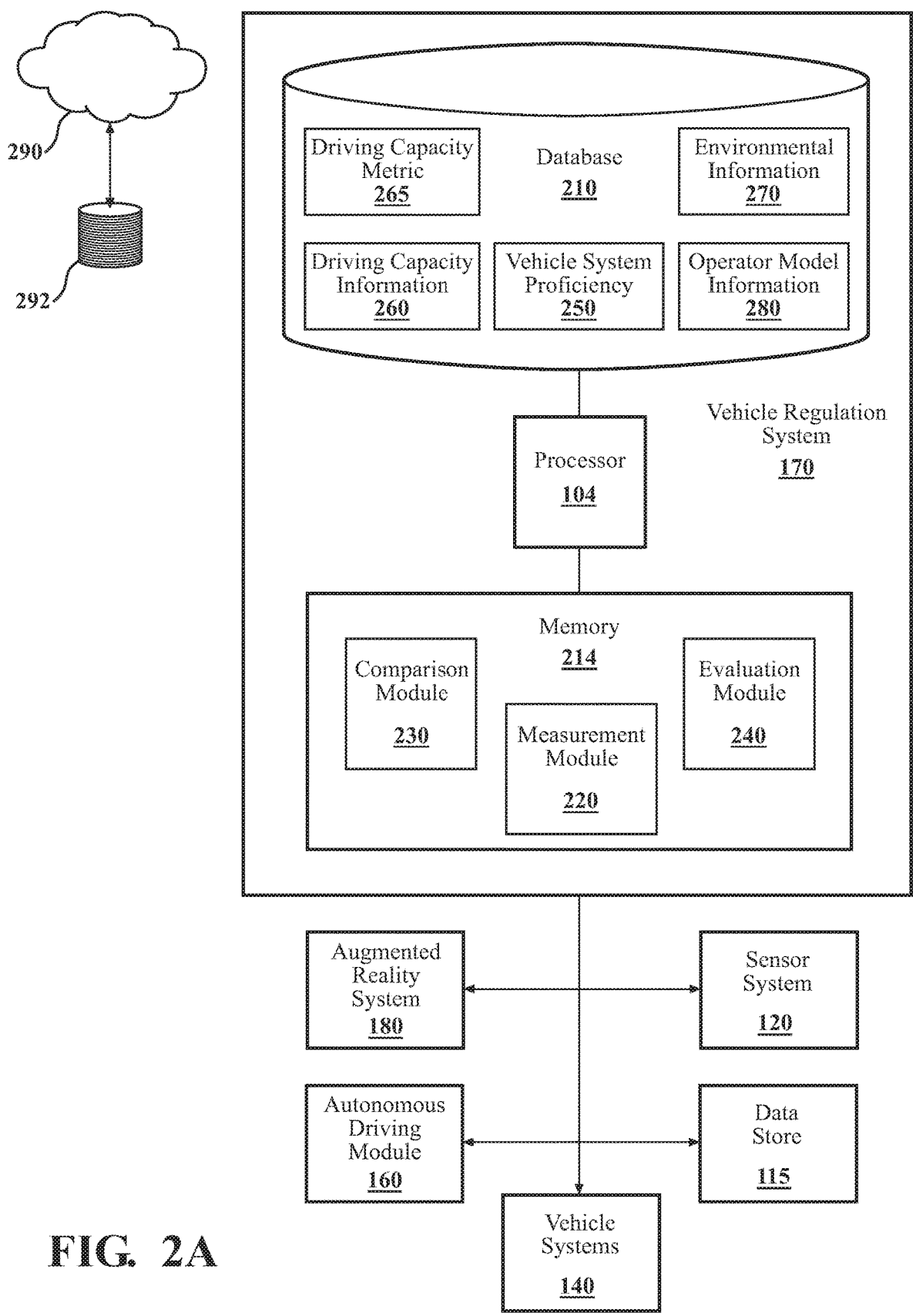
FIG. 2A is an illustration of the vehicle regulation system for regulating vehicle access by an operator, according to embodiments described herein.

The vehicle regulation system 170 is more clearly described with reference to FIG. 2A. The vehicle regulation system 170 is shown as including a processor 110 from the vehicle 100, depicted in FIG. 1. Accordingly, the processor 110 can be a part of the vehicle regulation system 170, the vehicle regulation system 170 can include a separate processor from the processor 110 or the vehicle regulation system 170 can access the processor 110 through a data bus or another communication path. In one embodiment, the vehicle regulation system 170 includes the memory 214 that stores a measurement module 220, a comparison module 230 and an evaluation module 240. The memory 214 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

The measurement module 220 generally includes instructions that function to control the processor 110 to determine, using driving capacity information 260, a driving capacity metric 265 for an operator in a vehicle. More specifically, the driving capacity information 260 broadly covers information on the operator's performance and personal characteristics while operating the vehicle 100, such as behaviors, mannerisms, personality, medical information, and others that may directly or indirectly relate to performance while operating a vehicle. The driving capacity information 260 can include the ability of the operator to handle one or more vehicle systems of a vehicle as they relate to operating the vehicle, such as a propulsion system 141, a braking system 142, a steering system 143, a signaling system 146, other systems, and combinations thereof. In one example, the driving capacity information 260 can include driving experience, ability to control any or all of the vehicle systems, specific environments the operator is accustomed to, changes in capacity over time, medical information about the operator (e.g., sundown syndrome, onset of dementia, etc.), sensor data, or other information about the operator which can be related to driving capability.

The driving capacity information 260 can include information collected using one or more sensors. The sensors, as used herein, can include sensors which are positioned either internal (e.g., positioned inside the vehicle) or external (positioned on the exterior of the vehicle). Exemplary sensors, which can be adapted for the systems and methods described herein, include image capture devices (e.g., cameras, thermal imaging), audio devices (e.g., microphones), and others. The sensors can be part of the sensor system 120, depicted as part of the vehicle 100 of FIG. 1. In one embodiment, the measurement module 220 can receive driving capacity information 260 using the sensor system 120. The measurement module 220 can receive data from the sensor system 120 prior to, during or after an operator has driven the vehicle. Data collected by the sensors about the operator, which can be used in producing the driving capacity information 260, includes facial expressions, gaze, positioning, actions which result in vehicle movement, attentiveness and alertness, and others. As such, the driving capacity information 260 is information related to the driving capacity of an operator and can include the driving capacity metric 265.

The driving capacity metric 265 is information collected by the vehicle regulation system 170 regarding the operator's performance with one or more of the vehicle systems 140. The driving capacity metric 265 can be stored as part of the driving capacity information 260. The driving capacity metric 265 can be expressed numerically, such as a series of numbers or ranges which indicate some portion of the operator's performance regarding one or more systems. The driving capacity metric 265 can be a collection of one or more indicators of the operator's driving capacity. In one embodiment, the driving capacity metric 265 can be a series of measurements related to driving characteristics. The driving capacity metric 265, though inherently related to the vehicle system 140 it was sourced from, can be applicable, directly or indirectly, to each of the vehicle systems 140. Exemplary embodiments of the driving capacity metric 265 include change in position, velocity, acceleration, surging, distance from obstacles, maintenance of lane position and others. Further embodiments are envisioned without specific recitation herein.

The measurement module 220, using the sensor system 120, can further collect information about the environment, which can be used in evaluating the proficiency level 255 of the operator. In one embodiment, the measurement module 220 can make a determination of how the operator should perform under a specific set of driving conditions. As such, the measurement module 220 can collect environmental information 270 which can form the basis for the vehicle regulation system 170 determination of the expected operator driving behavior. The environmental information 270 can include information collected from the environment around the vehicle 100 during one or more time points. In one embodiment, the environmental information 270 includes information about the position of the vehicle, the atmospheric conditions, time of day, traffic levels, general location type (neighborhood, highway, etc.) and others. Using the environmental information 270 and the driving capacity information 260, the measurement module 220 can make an evaluation of the operator capability, which can be stored as part of the driving capacity metric 265.

The comparison module 230 generally includes instructions that function to control the processor 110 to evaluate a vehicle system 140 of the vehicle 100 for a vehicle system proficiency 250. The vehicle systems 140, as described above with reference to FIG. 1, can include a vehicle system proficiency 250. The vehicle system proficiency 250 is the operator proficiency that vehicle regulation system 170 has designated as the boundary of access or removal of limitations to one or more of the vehicle systems 140. The vehicle system proficiency 250 can be individualized to specific vehicles systems or provided generally. In some embodiments, the vehicle system proficiency 250 can be tiered, in that all systems of a specific level are made available, once the operator is determined to have a driving capacity metric 265 which qualifies the operator for that level of access. In other embodiments, the vehicle system proficiency 250 is individually associated, such that the access levels available to the operator are controlled with respect to operator performance with that vehicle system.

The comparison module 230 can further include instructions to compare the driving capacity metric 265 and the vehicle system proficiency 250. Once the vehicle system proficiency 250 has been established, the driving capacity metric 265 can be compared with the vehicle system proficiency 250. The comparison from the comparison module 230 can include qualitative measurements (e.g., the operator is performing steering functions at an "average level") and quantitative measurements (e.g., minimum vehicle system proficiency for access to the steering system is 2.5 out of 10, and the driving capacity metric 265 for the operator is 6.7). The vehicle system proficiency 250 can include both the limits of human operation of the vehicle and the limits of the vehicle systems 140. As such, the vehicle system proficiency 250 can be vehicle specific, having limitations related to a specific operator and/or a specific vehicle. As well, the vehicle system proficiency 250 can change over time as the vehicle systems 140 deteriorate or are repaired. In further embodiments, the vehicle system proficiency 250 can change over time to reflect the limits of safe operation of a system which has more usage or deterioration.

In a further embodiment, the driving capacity metric 265 for the operator at a first system can be compared or considered in the comparison of the driving capacity metric 265 for the operator at a second system. In one example, the driving capacity metric 265 for the operator at the steering system 143 (i.e., the second system) compares favorably with the vehicle system proficiency 250 for the steering system 143. However, the driving capacity metric 265 for the operator at the propulsion system 141 (i.e., the first system) compares unfavorably with the vehicle system proficiency 250 for the propulsion system 141. The comparison module 230 can then use the comparison at the propulsion system 141 in the comparison at the steering system 143, or vice versa.

The evaluation module 240 generally includes instructions that function to control the processor 110 to determine, using the comparison, a proficiency level 255 of the operator for the vehicle system. The proficiency level 255 of the operator is the operator's competence and proficiency, as determined from the driving capacity metric, for the vehicle systems being considered. The proficiency level 255 of the operator can be determined with regards to an anticipated behavior 285. The anticipated behavior 285 can be a vehicle control behavior, expected by the vehicle regulation system 170, from the operator. The anticipated behavior 285 can be derived from a variety of sources, including collected operator information (e.g., the use of a plurality of operator sources to create an operator model), optimal operator information (e.g., an expert operator), vehicle control models (e.g., expected operator behavior based on the operations of an autonomous driving system), or others which can provide an indication of the expected operator behavior. The anticipated behavior 285 can include proper turning, the berth given to other vehicles, maintenance of traction, control under specific driving conditions, action timing, attentiveness, and other safety and vehicle control related factors.

The evaluation module 240 can further include instructions to control the vehicle systems 140 in light of the proficiency level 255. The evaluation module 240 can be in communication with one or more systems or devices in the vehicle 100, such as the data store 115, the sensor system 120, the vehicle systems 140, the autonomous driving module 160, the augmented reality system 180, other systems, or combinations thereof. The evaluation module 240 can then either stop or limit access to a connected system, such that the operator level of access to said system reflects the proficiency level 255. The evaluation module 240 can further forward guidance to the operator with regard to various restrictions and allowances in the vehicle systems 140. The evaluation module 240 can include providing information in a graphical or verbal form to the operator in the vehicle 100, such as through an augmented reality system 180, described with reference to FIG. 1.

In an optional embodiment, the anticipated behavior 285 can be stored as part of the operator model 280. The operator model 280 is a collection of information which provides guidance to the vehicle regulation system 170 regarding the quality of one or more driving behaviors and actions. The operator model 280 can include driving information collected regarding one or more operators. In this embodiment, the driving information regarding the one or more operators can be used in determining the anticipated behavior 285. In one example, the driving information is used to create a model to predict the anticipated behavior. In another example, the driving information is used to select or modify a preexisting model. One skilled in the art will understand the various permutations available for the use of said driving information.

As noted above, the proficiency level 255 can be either tiered or individually-associated implementations. In a tiered implementation, the proficiency level for one or more vehicle systems 140 is generalized into a skill range, such as a skill range from novice to expert. In one example of a tiered implementation, once the driving capacity metric 265 reaches a level considered to be intermediate, all vehicle systems 140 are made available in non-highway environments. In individually-associated implementations, the proficiency level 255 for each of the vehicle systems 140 is presented individually and vehicle systems 140 are controlled based on said individual measurement. In one example of an individually associated implementation, the driving capacity metric 265 is determined for steering, braking, control, responsiveness and others, such that the availability of each system is dependent on the individual metric. Other embodiments are contemplated without specific recitation herein.

The evaluation module 240 can further include instructions to provide access to the vehicle systems based on the proficiency level 255. In embodiments described herein, the vehicle 100, through the vehicle regulation system 170, can control access to the vehicle systems 140. The evaluation module 240 can limit or allow access to one or more vehicle systems 140. In another embodiment, the evaluation module 240 can allow access to portions of vehicle systems 140, such as restricting the vehicle speeds. In further embodiments, the evaluation module 240 can control access to the vehicle systems 140 based on environmental parameters, such as time of day or location that the operator intends to operate the vehicle 100.

Further, the evaluation module 240 can include instructions to modulate access to the vehicle systems 140 based on a variety of events, such as over time, based on health conditions, or as the proficiency level 255 of the operator improves. The vehicle regulation system 170 can update over time, collecting information related to the proficiency level 255 of the operator. The proficiency level 255 can be determined with relation to time of day (e.g., improvement when the sun is up), location (e.g., operator drives more proficiently in neighborhoods), or others. Further, the vehicle regulation system 170, as described above, can be adaptive to multiple operators. The vehicle regulation system 170, through the modules 220, 230 and 240, can create multiple profiles. Each profile, as associated to a specific operator, can include the individual proficiency level 255s of each operator, such that each operator has access to the vehicle systems 140 based on individual capacity.

Figure 2B:
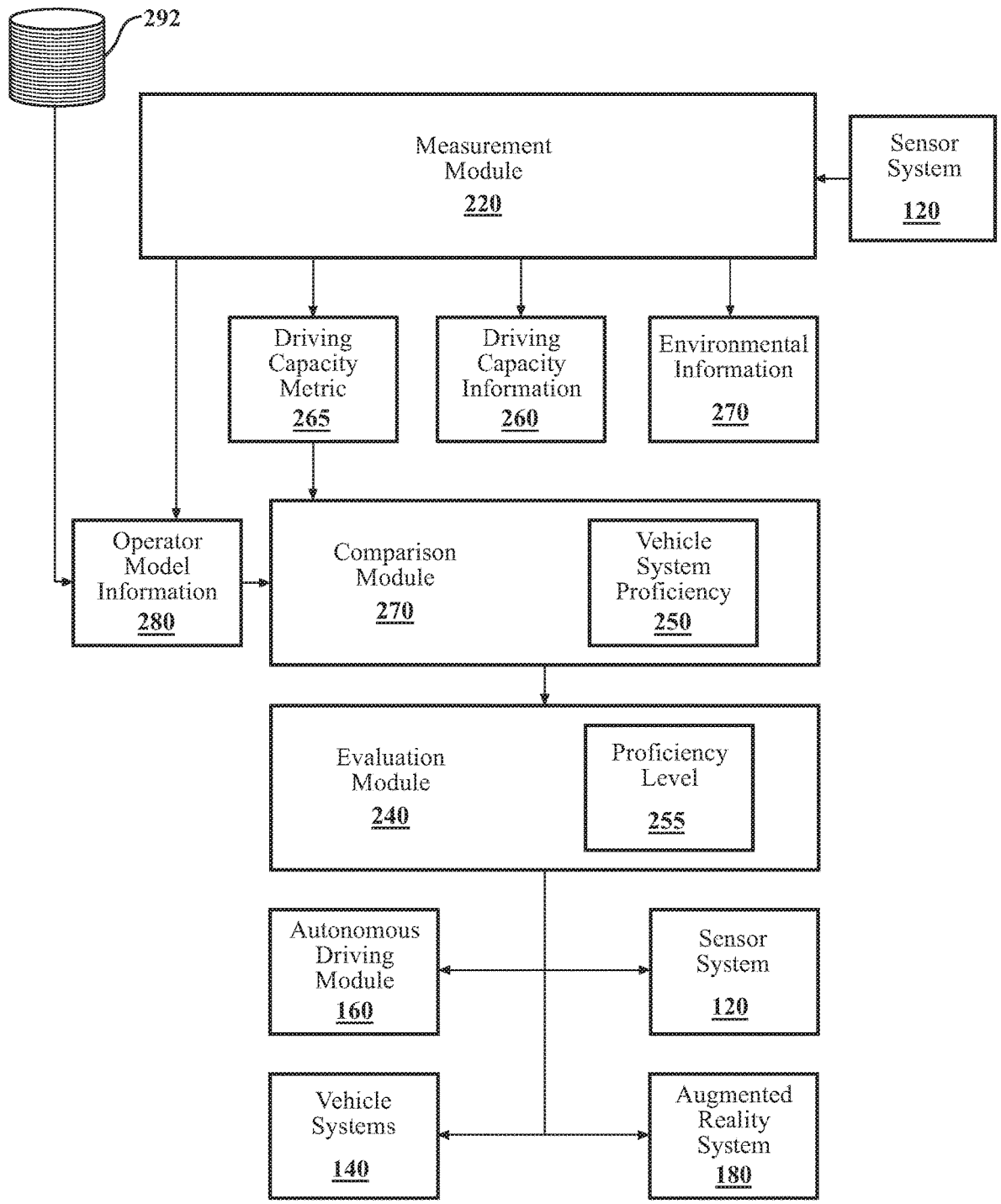
FIG. 2B is a schematic of the vehicle regulation system, according to one or more embodiments.

FIG. 2B depicts a schematic of the vehicle regulation system 170, according to one or more embodiments. The vehicle regulation system 170 collects information regarding the operator and the environment, through measurement module 220. This information is forwarded to the comparison module, which sets the boundaries for access to the systems and compares the operator proficiency to said boundaries. The comparison from the comparison module 230 is then forwarded to the evaluation module 240, which determines the operator proficiency and allows access based on said proficiency As shown here, the measurement module 220 receives input from a sensor system, such as the sensor system 120. The information received can include information regarding operator performance in operating the vehicle 100 and information about the environment and surroundings. The sensors of the sensor system 120 can include image capture devices, audio capture devices, LIDAR, RADAR, and others. The information received can then be processed by the measurement module 220 to driving capacity information 260 and environmental information 270, described above with reference to FIG. 2A. The driving capacity information 260, including the driving capacity metric 265, and environmental information 270 can then be forwarded to the to the comparison module 230.

The comparison module 230 can then apply the driving capacity metric 265 and the environmental information 270 to a determined vehicle system proficiency 250. Initially, the comparison module 230 forms a vehicle system proficiency 250. The vehicle system proficiency 250 can be created based on the environmental information 270, circumstantial expectations based on other operator performance or model systems (e.g., the operator model 280), or others. As stated above, the operator model 280 can be derived from a number of sources, both local to the vehicle 100 and remote (e.g., a server 292 via the "cloud" 290). The driving capacity metric 265 can then be applied to the vehicle system proficiency, in light of the environmental information 270 which is relevant to operator performance. The driving capacity metric 265 is shown here as a separate element, but it is to be understood that the driving capacity metric 265 can be a portion of the driving capacity information 260, described above with reference to FIG. 2A.

Further, the driving capacity information 260 can be applied to determining or otherwise modifying the comparison of the driving capacity metric 265 with the vehicle system proficiency 250. In one example, the driving capacity information 260 includes information regard operator road rage. In this instance, the operator would be otherwise qualified to access the vehicle systems 140. However, based on this road rage information and information regarding highway traffic, the vehicle regulation system 170 can then modify the comparison to reflect the above information. One skilled in the art will understand the variety of permutations available regarding the above comparison. Other embodiments are contemplated without specific recitation herein.

The comparison module 230 can then forward the comparison to the evaluation module 240. The evaluation module 240 can then determine the proficiency level 255 from the comparison, as described above with reference to FIG. 2A. The proficiency level of the operator is then used to determine the regulation of the vehicle systems 140 for that operator. The evaluation module 240 can further be updated, such that as the driving capacity metric 265 changes, the proficiency level 255 and the access to the vehicle systems 140 changes accordingly. Access to the vehicle systems 140 can be modified in a number of ways. In one example, if an operator does not have a proficiency level 255 which allows for access to one or more vehicle systems 140, control of said vehicle systems 140 can be given to an autonomous driving module, such as the autonomous driving module 160. In another example, the vehicle regulation system 170 can control said vehicle systems 140. In another example, access to said vehicle systems can be limited rather than stopped entirely, with or without autonomous control of the vehicle systems to complement operator control.

Thus, the vehicle regulation system 170 can use the operator proficiency and performance to control the vehicle 100, thus providing numerous benefits to the operator and to the public. The vehicle regulation system 170 increase safety on the road by controlling autonomously for the operator, when the operator may not be capable of manual control. Further, the vehicle regulation system 170 can help an operator learn to drive more safely by educating the operator about the vehicle regulations. Finally, the vehicle regulation system 170 can change control levels over time, thus reaffirming the operator's confidence and providing appropriate vehicle access as driving proficiency changes.

Figure 3:
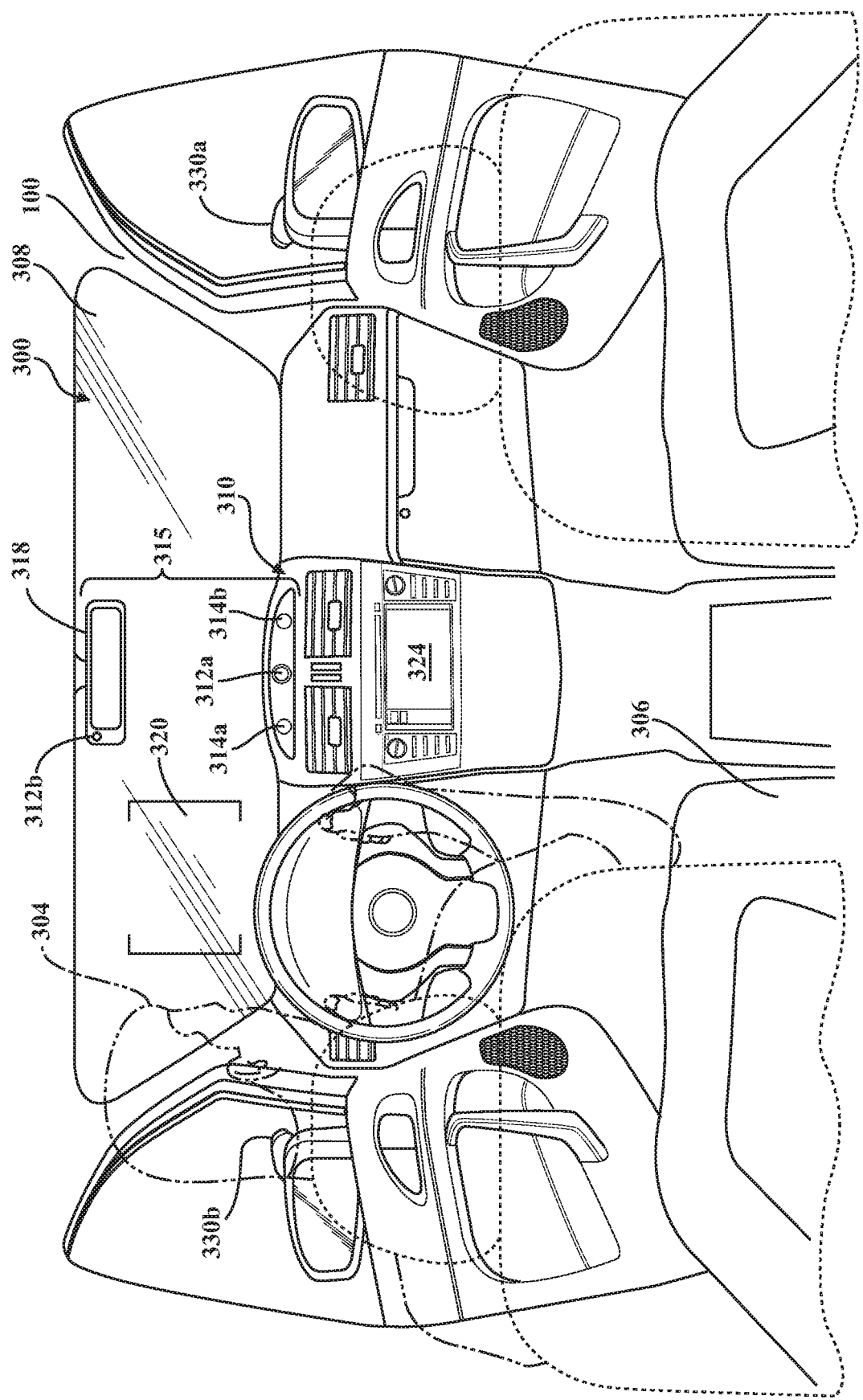
FIG. 3 depicts an operator in a vehicle incorporating the vehicle regulation system, according to embodiments described herein.

FIG. 3 depicts an operator 304 in an interior portion 300 of the vehicle 100, according to embodiments described herein. In this embodiment, the vehicle 100 incorporates the vehicle regulation system 170. The operator 304 is positioned in the operator seat 306 of the vehicle 100. The vehicle 100 can be semi-autonomous or autonomous, as described with reference to FIG. 1. Generally, the vehicle 100 can include a windshield 308 and a dashboard 310, and a mirror 318. The vehicle 100 can further include internal sensors 315, such as an image capture device 312a and 312b (e.g., a camera or an infrared sensor) and/or one or more audio capture devices 314a and 314b (e.g., microphones or SONAR). In some embodiments, the image capture devices 312a and 312b and the audio capture devices 314a and 314b are integrated into the vehicle 100, such as into the dashboard 310 and/or the mirror 318. The sensors used in embodiments described herein can further include external sensors 330a and 330b, which can be one or more of the sensors described as part of the sensor system 120 in FIG. 1.

In the exemplary embodiment shown here, the vehicle regulation system 170 begins through instructions from the measurement module 220. The measurement module 220 includes instructions to collect driving capacity information 260 for the operator 304. The vehicle regulation system 170 can begin with the operator 304 operating the vehicle 100 through one or more locations, such as neighborhoods, highways, off road, or other locations which vehicles may be operated. The measurement module 220 then accesses one or more internal sensors, such as the image capture devices 312a and 312b and/or the audio capture devices 314a and 314b. The image capture devices 312a and 312b can be any device capable of collecting images of one or more objects, such as a video camera. The image capture devices 312a and 312b can be positioned to collect images of a portion of the interior portion 300 of the vehicle 100. In one embodiment, the image capture device 312 is positioned in the interior portion 300 of the vehicle 100, such as integrated with the dashboard 310 or the mirror 318.

The measurement module 220, through the internal sensors 315, can collect information regarding the driving capacity information 260 of the operator 304, including attention span, focus, spatial recognition, knowledge of applicable driving laws based on location, maneuvering, acceleration, and others. In the embodiment depicted here, the measurement module 220 uses the image capture devices 312a and 312b and the audio capture devices 314a and 314b to collect speech, direction of gaze, movement of the steering wheel, positioning and posture, and others from the operator 304. Further vehicle sensors from the sensor system 120 (e.g., fuel flow sensors, GPS sensors, and others) can be incorporated into the driving capacity information 260 and used provide real time measurement of vehicle action and performance.

The operator 302 can operate the vehicle 100 in a standard fashion while the measurement module 220 collects information about the operator 304. The vehicle regulation system 170 can have a default level of access prior to a determination of the proficiency level 255 of the operator. The default level of access can be full access, limited access, or others as determined by the vehicle registration system 170, the operator 304 or the end user. The vehicle regulation system 170 can collect the driving capacity information 260 over a period of time, such as a period of days, weeks or months. The driving capacity information 260 can include the driving capacity metric 265 for the operator 304. The driving capacity metric 265 can include data points for specific vehicle systems 140, based on the operator's performance in the vehicle 100. The above data and information can be collected simultaneously with the environmental information 270, which can used to indicate the result of the actions and observations through association with the driving capacity information 260.

In a further embodiment, the operator 304 can have operated the vehicle 100 or another vehicle having at least a portion of the vehicle regulation system 170 one or more previous times. In this case, the vehicle regulation system 170 can have the driving capacity information 260, the driving capacity metric, and/or the environmental information 270 previously stored in the database 210 or in another data store. In this embodiment, the vehicle regulation system 170 can access or retrieve the driving capacity information 260 and/or the environmental information 270, for use in determining the vehicle regulation described herein. In the example shown here, the operator 304 has full access to the vehicle systems 140, by default.

The vehicle regulation system 170, using the measurement module 220, can forward the driving capacity information 260, the driving capacity metric 265, the environmental information 270, and/or the operator model 280 to the comparison module 230. The comparison module 230 can include instructions to determine or acquire the vehicle system proficiency 250, in light of the environmental information 270. The vehicle system proficiency 250 can be determined while the vehicle 100 is being operated by the operator 304. Further, the vehicle system proficiency 250 can incorporate the operator model 280. As the operator 304 controls the vehicle 100 during normal operation, the capabilities of the vehicle systems 140 can be detected by the vehicle regulation system 170. In the example shown here, the operator 304 is operating the vehicle 100 on a neighborhood street. Further examples can include different locations, higher rates of speed or other factors which can be used to differentiate the capabilities of the various vehicle systems 140.

During this time, the vehicle regulation system 170 is collecting information regarding proper movement of the steering column, abnormal changes in position of the vehicle, maintenance of traction between the tires and the road, quality of fuel flow during acceleration, proper oxygen mixture, and other operational characteristic of the vehicle 100. This information can be collected by either the measurement module 220, the comparison module 230 or combinations thereof. The above information can be compared with the operator model 280 to create the vehicle system proficiency make a determination of the inputs from a possible operator (e.g., operator 304) which can maintain control and/or safety for each of the system of the vehicle 100, otherwise referred to as the vehicle system proficiency 250.

The comparison module 230 can further include instructions to compare the driving capacity metric 265 to the vehicle system proficiency 250, in light of driving capacity information 260. As described above, the vehicle system proficiency 250 includes inputs or input ranges which can maintain safety and/or control of each of the vehicle systems 140. Thus, the inputs received from the operator 304 can then be compared to the vehicle system proficiency 250 for at least one of the vehicle systems 140. The comparison can be a determination of whether the driving capacity metric 265 falls within or near the vehicle system proficiency 250. In further embodiments, the comparison of the comparison module 230 can be based on proximity to the input or input ranges set by the vehicle system proficiency 250. The comparison of the comparison module 230 can further include statistical measures of the driving capacity metric 265 to the vehicle system proficiency 250. In one example, the operator 304 can have made a total of six (6) turns at an intersection 340. Of the six turns, only five (5) could have been deemed proficient with the sixth turn being deemed inadequate by a wide margin. In this case, an average might indicate an outlying driving capacity metric 265 for the steering system 143. However, standard deviations or exclusion of outliers in the driving capacity metric 265 can indicate that the operator 304 falls within the vehicle system proficiency 250 as described above.

The evaluation module 240 can then apply the comparison from the comparison module 230 to determine the proficiency level of the operator 304. A comparison of the information from the operator 304, including vehicle system proficiency 250 and the driving capacity metric 265, can then be analyzed in light of driving events, conditions and situations provided by the environmental information 270 and the driving capacity information 260, to determine the proficiency level 255 of the operator 304. Thus, in this way, the evaluation module 240 can act as a check on the comparison at the comparison module 230.

Using the example from above, the operator 304 is driving neighborhood streets and had one inadequate turn of six total turns at the intersection 340. As noted above, the average of the driving capacity metric 265 indicated an outlying driving capacity metric 265 for the steering system 143. Here, as the evaluation module 240 reviews the driving capacity information 260 for information which explains the measurements of the driving capacity metric 265. Further, the evaluation module 240 can review the environmental information 270 for information which correlates the real world events with the driving capacity metric 265. In this review, the evaluation module 240 can recognize from the environmental information 270 that during the inadequate turn, an animal crossed into the intersection 340. The evaluation module 240 can then confirm, using the driving capacity information 260 that the actions of the operator 304 were consistent with an evasive maneuver to avoid the animal. The evaluation module 240 can then choose to exclude the inadequate turn from the evaluation, and determine that the proficiency level 255 accordingly, based on the driving capacity information 260 and the environmental information 270. One skilled in the art will understand that the above example can be expanded to a variety of events.

With the determination of the proficiency level 255 made, the evaluation module 240 can then provide or control access to the vehicle systems 140. As stated for the above example, the vehicle systems 140 are available to the operator 304, by default. Here, the evaluation module 240 has determined that the operator 304 has a proficiency level 255 which is adequate for the steering system 143. As such, the evaluation module 240 maintains full access for the operator 304. In further embodiments, the evaluation module 240 can move from a reduced/restricted access to full access, full access to reduced/restricted access, or others as the situation permits.

In further embodiments, the vehicle regulation system 170, through the evaluation module 240, can provide information to the operator 304 regarding the proficiency level 255. In one embodiment, the evaluation module 240 can include instructions to provide information to the operator 304 using a console display 324. In another embodiment, the evaluation module 240 can include instructions to provide information to the operator 304 using an augmented reality system 180, shown here as an operator display 320. In either the console display 324 or the augmented reality system embodiment, the evaluation module 240 can provide useful data or guidance to the operator 304 regarding the proficiency level 255. In one example, the evaluation module 240 provide the proficiency level 255 and appropriate explanation for the operator 304 or for other operators. The evaluation module 240 can further offer guidance regarding corrective measures or other hints to help the operator 304 improve his or her driving.

The vehicle regulation system 170 can provide numerous benefits to a vehicle operator. The vehicle regulation system 170 can provide insights into the vehicle operator's driving style and habits and, if there are areas for improvement, guidance for improving their driving. Further, the vehicle regulation system 170 can make the roads safer by restricting driving for the operator, if the operator does not show sound decision making or skill during vehicle operation.

Figure 4:
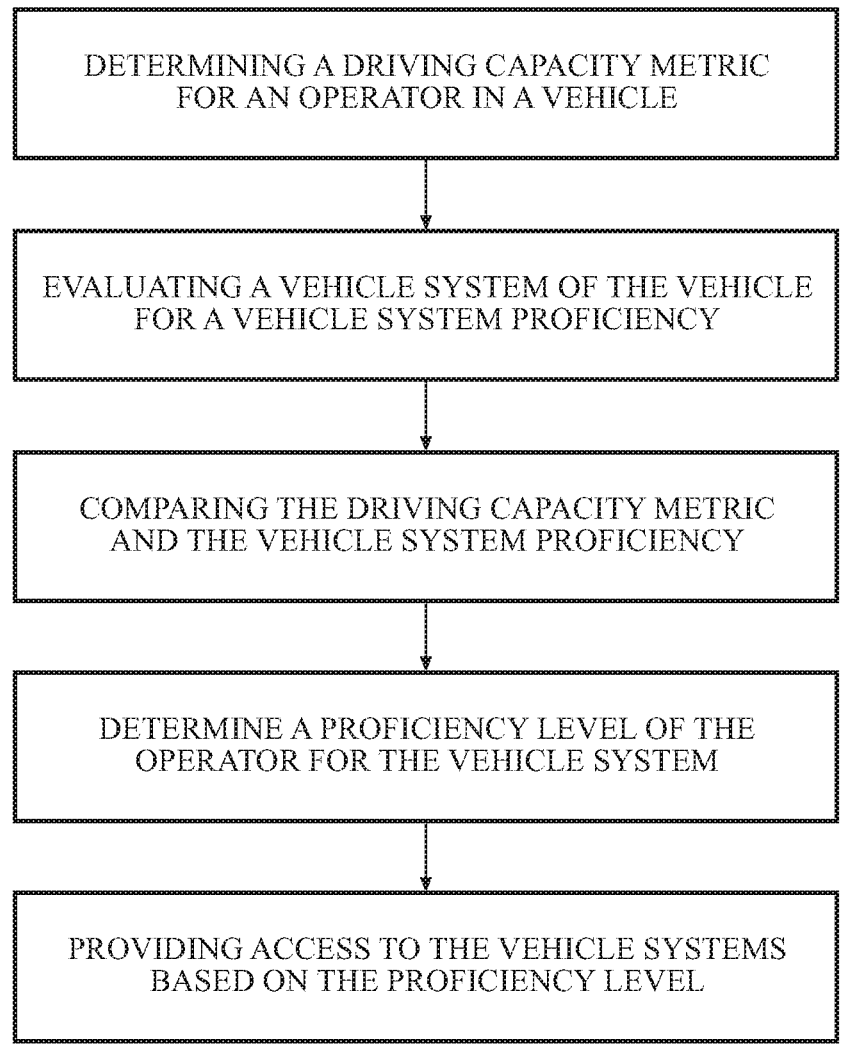
FIG. 4 is a flow diagram of a method for regulating vehicle access by an operator, according to one or more embodiments.

FIG. 4 is a flow diagram of a method 400 for regulating vehicle access by an operator, according to one or more embodiments. The method can include determining the proficiency level of the operator, either prior to, during or after operation of the vehicle. Once the operator proficiency level has been established, the method can determine what level of control the operator can safely handle for the vehicle. The level of control can be tiered, situations or others, as described above with regards to the vehicle regulation system 170 and as described herein. The method 400 can include determining a driving capacity metric for an operator in a vehicle, at 402. A vehicle system of the vehicle can then be evaluated for a vehicle system proficiency, at 404. The driving capacity metric and the vehicle system proficiency can then be compared, at 406. Using the comparison, a proficiency level of the operator can be determined for the vehicle system, at 408. Then, access to the vehicle systems can be provided based on the proficiency level, at 410.

The method 400 can begin with determining a driving capacity metric for an operator in a vehicle, at 402. The driving capacity metric is a determination of driving capability for the operator at one or more vehicle systems. The driving capacity metric can include individual or overall skill levels of the operator related to the vehicle systems. In one embodiment, the driving capacity metric are numerical metrics. The driving capacity metric can be substantially similar to the driving capacity metric 265, described with reference to FIGS. 2A and 2B. The driving capacity metric can be determined based on collected information from one or more sensors, such as the sensor system 120. As above, the driving capacity metric can be individualized to the specific vehicle system of the vehicle systems 140 or the driving capacity metric can be tiered. In further embodiments, the driving capacity metric can be collected by an external source, such as another vehicle, a simulator or others.

In some embodiments, the driving capacity metric can change with operator proficiency. Operator proficiency in a function of experience, practice, age, health, and other factors. As such, the driving capacity metric is expected to change over time. The method 400 can include changing the driving capacity metric based on operator proficiency changes. Further, the method 400 can include individual driving capacity metrics for each operator. In one or more embodiments, the driving capacity metric can be determined as part of a system, such as the vehicle regulation system 170 described with reference to FIGS. 2A and 2B. In one embodiment, the measurement module 220 of the vehicle regulation system 170 can include instructions to determine, using driving capacity information, the driving capacity metric for an operator in a vehicle. The driving capacity metric can include collecting information using one or more sensors, such as the sensor system 120 of the vehicle 100. The driving capacity metric can be stored as part of a database, such as the database 210 of the vehicle 100.

The vehicle system of the vehicle can then be evaluated for a vehicle system proficiency, at 404. The method 400 can then determine the vehicle system proficiency for the vehicle systems 140. The vehicle system proficiency is the proficiency that the method 400 uses to mediate access to the vehicle systems 140. The vehicle system proficiency can be substantially similar to the vehicle system proficiency 250, described with reference to FIGS. 2A and 2B. The vehicle system proficiency can be determined with relations to the environmental information, the operator model, and others. The vehicle system proficiency can be individualized to a specific vehicle system, tiered to reflect ability to control the vehicle systems generally, or others. The vehicle system proficiency can include various parameters for proficiency, including time of day, location of said operation, inclement weather, and others. Further, the vehicle system proficiency can change over time, based on vehicle deterioration, environmental changes, and others.

In one or more embodiments, the vehicle system proficiency can be determined as part of a system, such as the vehicle regulation system 170 described with reference to FIGS. 2A and 2B. In one embodiment, the comparison module 230 of the vehicle regulation system 170 can include instructions to evaluate the vehicle system of the vehicle for a vehicle system proficiency, such as the vehicle system 140 of the vehicle 100. The driving capacity metric can include collecting information using one or more sensors, such as the sensor system 120 of the vehicle 100. The vehicle system proficiency can be stored as part of a database, such as the database 210 of the vehicle 100.

The driving capacity metric and the vehicle system proficiency can then be compared, at 406. The driving capacity metric reflects the capability of the operator, whereas the vehicle system proficiency denotes the effective boundary or boundaries before one or more levels of access to a system are available. As such, the method 400 compares the driving capacity metric and determines where the driving capacity metric falls, as compared to the vehicle system proficiency.

The comparison from the method 400 can include determining relative proximity between the driving capacity metric and the vehicle system proficiency. In one or more embodiments, the comparison can be performed as part of a system, such as the vehicle regulation system 170 described with reference to FIGS. 2A and 2B. In one embodiment, the comparison module 230 of the vehicle regulation system 170 can include instructions to determine, using driving capacity information, the driving capacity metric for an operator in a vehicle. The driving capacity metric can include collecting information using one or more sensors, such as the sensor system 120 of the vehicle 100. The driving capacity metric can be stored as part of a database, such as the database 210 of the vehicle 100.

Using the comparison, a proficiency level of the operator can be determined for the vehicle system, at 408. The method 400 can determine the proficiency level of the operator using the comparison, environmental information, driving capacity information, or others. The environmental information can include information collected from the environment around the vehicle during one or more time points. The driving capacity information can include information collected with relations to the driving capacity metric. In one embodiment, the driving capacity metric provides a numerical indication of adequate or inadequate proficiency for the driving systems, while environmental information and driving capacity information provide guidance with regard to the circumstances of the driving capacity metric.

The driving capacity information, the driving capacity metric, and the environmental information can be substantially similar to the driving capacity information 260, the driving capacity metric 265, and the environmental information 270 of the vehicle regulation system 170, described with reference to FIGS. 2A and 2B. In one or more embodiments, the proficiency level can be determined as part of a system, such as the vehicle regulation system 170 described with reference to FIGS. 2A and 2B. In one embodiment, the evaluation module 240 of the vehicle regulation system 170 can include instructions to determine, using the comparison, a proficiency level of the operator for the vehicle system. The proficiency level can be derived using the driving capacity information 260, the driving capacity metric 265, and the environmental information 270. The driving capacity information 260, the driving capacity metric 265, and the environmental information 270 can be collected using one or more sensors, such as the sensor system 120 of the vehicle 100. The proficiency level 255 can be stored as part of a database, such as the database 210 of the vehicle 100.

Then, access to the vehicle systems can be provided based on the proficiency level, at 410. With the proficiency level determined, the method 400 can then alter vehicle system access in light of the proficiency level. In vehicles which start with full access by default, the method 400 can reduce access in light of inadequate proficiency levels or otherwise maintain said vehicle system access. In vehicles which start with limited or no access, the method 400 can increase vehicle system access in light of adequate proficiency levels, maintain limited to no access in light of inadequate proficiency levels, or otherwise alter access to reflect adequate or inadequate proficiency levels.

In further embodiments, the method 400 can offer guidance to the operator related to the proficiency level. The guidance can include the operator proficiency level, explanation as to the scoring and the measurements, and possible areas of improvement. The guidance can be delivered verbally, such as through a display. One such display, which can be adapted for the method 400, is the display 324 of the vehicle 100, described with reference to FIG. 3. In one or more embodiments, the vehicle system access can be provided as part of a system, such as the vehicle regulation system 170 described with reference to FIGS. 2A and 2B. In one embodiment, the evaluation module 240 of the vehicle regulation system 170 can include instructions to provide access to the vehicle systems based on the proficiency level. The access to the vehicle systems 140 of the vehicle 100 can reflect the proficiency level 255 of the operator, as described above.

The method 400 described herein can control access to one or more vehicle systems, based on the proficiency level of the operator. As such, the method 400 provides numerous benefits to both the operator and the surrounding environment. The method 400 can provide control limited by the operator capability, which can increase road safety for the operator and other drivers. Further, the method 400 can include guidance to the operator regarding proficiency level, which will help the operator improve driving performance.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from an operator (e.g., a human user/driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from an operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the operator is to monitor the driving and be vigilant and ready to intervene with controlling the vehicle 100 if the autonomous driving module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include map data 116 and/or sensor data 119. In this context, "map data" refers to any data providing relative proximity between two objects, usable by the vehicle 100, one or more systems of the vehicle 100, or the operator. "Sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator in order to determine a gaze of the operator, an eye track of the operator, and so on.

The vehicle 100 can include an input system 130. An "input system" includes any device, component, system, element or arrangement or groups thereof that enable information/data to be entered into a machine. The input system 130 can receive an input from a vehicle passenger (e.g., an operator or a passenger) or from external systems, such as from the vehicle regulation system 170, described above with reference to FIG. 2A. The vehicle 100 can include an output system 135. An "output system" includes any device, component, or arrangement or groups thereof that enable information/data to be transmitted to the vehicle or presented to a vehicle passenger (e.g. a person, a vehicle passenger, etc.). The output system 135 can be configured to communicate sensor data and other information to the vehicle regulation system 170, as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vehicle regulation system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the vehicle regulation system 170, and/or the autonomous driving module(s) 160 may control some or all of these vehicle systems 140 and, thus, may be partially or fully autonomous.

The processor(s) 110, the vehicle regulation system 170, and/or the autonomous driving module(s) 160 can be operably connected to communicate with the various vehicle systems 140 and/or individual components thereof. For example, returning to FIG. 1, the processor(s) 110, the vehicle regulation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the vehicle regulation system 170, and/or the autonomous driving module(s) 160 may control some or all of these vehicle systems 140.

The processor(s) 110, the vehicle regulation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the vehicle regulation system 170, and/or the autonomous driving module(s) 160 can control the direction and/or speed of the vehicle 100. The processor(s) 110, the vehicle regulation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vehicle regulation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the vehicle regulation system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience. The noted functions and methods will become more apparent with a further discussion of the figures.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A vehicle regulation system for regulating vehicle access by an operator, comprising:
   one or more processors; and
   a memory communicably coupled to the one or more processors and storing:

a measurement module including instructions that when executed by the one or more processors cause the one or more processors to determine, using driving capacity information, a driving capacity metric for an operator in a vehicle, the driving capacity information comprising operator performance and personal characteristics of the operator, the operator performance being skill in operating a plurality of vehicle systems in light of various environmental characteristics as derived from external sensors of the vehicle, the personal characteristics including at least one of behaviors, mannerisms, personality, alertness, and medical information about the operator;

a comparison module including instructions that when executed by the one or more processors cause the one or more processors to evaluate the plurality of vehicle systems in the vehicle for a vehicle system proficiency, and to compare the driving capacity metric and the vehicle system proficiency; and an evaluation module including instructions that when executed by the one or more processors cause the one or more processors to determine, using the comparison, a proficiency level of the operator for a selected vehicle system of the plurality of vehicle systems, the selected vehicle system being selected based on an anticipated behavior, to provide, to the operator, access to the selected vehicle system based on the proficiency level; and to deliver guidance including corrective measures to the operator regarding the proficiency level using one of more communication systems in the vehicle.

2. The vehicle regulation system of claim 1, wherein the measurement module further comprises instructions to collect driving capacity information and environmental information for the operator in the vehicle.

3. The vehicle regulation system of claim 2, wherein the evaluation module further comprises instructions to use the driving capacity information as affected by the environmental information in determining changes in the proficiency level of the operator related to time of day or location of the operator.

4. The vehicle regulation system of claim 1, wherein the vehicle system proficiency is determined using an operator model.

5. The vehicle regulation system of claim 1, and wherein one of a plurality of individualized metrics is associated with a respective one of the plurality of vehicle systems.

6. The vehicle regulation system of claim 5, wherein the comparison module further comprises instructions to compare the driving capacity metric and the vehicle system proficiency at each of the plurality of individualized metrics.

7. The vehicle regulation system of claim 1, wherein the measurement module, the comparison module and the evaluation module are executed one or more times to determine a plurality of proficiency levels, wherein the plurality of proficiency levels are used to update one or more conditional proficiency levels as related to one or more driving conditions in an operator model.

8. A non-transitory computer-readable medium for regulating vehicle access by an operator and storing instructions that when executed by one or more processors cause the one or more processors to:

determine, using driving capacity information, a driving capacity metric for an operator in a vehicle, the driving capacity information comprising operator performance and personal characteristics of the operator, the operator performance being skill in operating a plurality of vehicle systems in light of various environmental characteristics as derived from external sensors of the vehicle, the personal characteristics including at least one of behaviors, mannerisms, personality, alertness, and medical information about the operator;

evaluate the plurality of vehicle systems in the vehicle for a vehicle system proficiency;

compare the driving capacity metric and the vehicle system proficiency;

determine, using the comparison, a proficiency level of the operator for a selected vehicle system of the plurality of vehicle systems, the selected vehicle system being selected based on an anticipated behavior;

provide, to the operator, access to the selected vehicle system based on the proficiency level; and deliver guidance including corrective measures to the operator regarding the proficiency level using one of more communication systems in the vehicle.

9. The non-transitory computer-readable medium of claim 8, further comprising instructions to collect driving capacity information and environmental information for the operator in the vehicle, wherein the driving capacity information and the environmental information are used in determining changes in the proficiency level of the operator related to time of day or location of the operator.

10. The non-transitory computer-readable medium of claim 8, wherein the vehicle system proficiency is determined using an operator model.

11. The non-transitory computer-readable medium of claim 8, wherein one of a plurality of individualized metrics is associated with a respective one of the plurality of vehicle systems.

12. The non-transitory computer-readable medium of claim 11, further comprising instructions to compare the driving capacity metric and the vehicle system proficiency at each of the plurality of individualized metrics.

13. The non-transitory computer-readable medium of claim 8, wherein the instructions are executed one or more times to determine a plurality of proficiency levels, wherein the plurality of proficiency levels are used to update one or more conditional proficiency levels as related to one or more driving conditions in an operator model.

14. A method for regulating vehicle access by an operator, comprising:

determining, using driving capacity information, a driving capacity metric for an operator in a vehicle, the driving capacity information comprising operator performance and personal characteristics of the operator, the operator performance being skill in operating a plurality of vehicle systems in light of various environmental characteristics as derived from external sensors of the vehicle, the personal characteristics including at least one of behaviors, mannerisms, personality, alertness, and medical information about the operator;

evaluating the plurality of vehicle systems in the vehicle for a vehicle system proficiency;

comparing the driving capacity metric and the vehicle system proficiency;

determining, using the comparison, a proficiency level of the operator for a selected vehicle system of the plurality of vehicle systems, the selected vehicle system being selected based on an anticipated behavior; and providing, to the operator, access to the selected vehicle system based on the proficiency level; and delivering guidance including corrective measures to the operator regarding the proficiency level using one of more communication systems in the vehicle.

15. The method of claim 14, further comprising collecting driving capacity information and environmental information for the operator in the vehicle, wherein the driving capacity information as affected by the environmental information is used in determining changes in the proficiency level of the operator related to time of day or location of the operator.

16. The method of claim 14, wherein the vehicle system proficiency comprises a plurality of individualized metrics associated with each of the plurality of vehicle systems.

17. The method of claim 14, further comprising determining a plurality of proficiency levels, wherein the plurality of proficiency levels are used to update one or more conditional proficiency levels as related to one or more driving conditions in an operator model.

* * * * *

UNITED STATES PATENT AND TRADEMARK OFFICE
CERTIFICATE OF CORRECTION

PATENT NO. : 10,551,835 B2
APPLICATION NO. : 15/918669
DATED : February 4, 2020
INVENTOR(S) : Julian M. Mason and Nikolaos Michalakis Page 1 of 1

It is certified that error appears in the above-identified patent and that said Letters Patent is hereby corrected as shown below:

In the Specification

Column 10, Line 17: delete "registration system" and insert --regulation system--

Signed and Sealed this
Seventh Day of July, 2020

Andrei Iancu
*Director of the United States Patent and Trademark Office*